United States Patent [19]

McDonald

[11] 4,055,707
[45] Oct. 25, 1977

[54] SELECTIVE COATING FOR SOLAR PANELS
[75] Inventor: Glen E. McDonald, Strongsville, Ohio
[73] Assignee: The United States of America as represented by the Administrator of the National Aeronautics and Space Administration, Washington, D.C.
[21] Appl. No.: 643,041
[22] Filed: Dec. 22, 1975
[51] Int. Cl.² .......................... F24J 3/02; B32B 15/18; B32B 15/20; B05D 3/12
[52] U.S. Cl. ..................................... 428/652; 126/270; 427/160; 428/667; 428/679
[58] Field of Search .................... 126/270, 271; 350/1; 427/162, 160; 428/652, 667, 679

[56]  References Cited
U.S. PATENT DOCUMENTS
2,917,817  12/1959  Tabor .................................... 126/270
3,920,413  11/1975  Lowery ................................. 126/270

OTHER PUBLICATIONS

NASA Technical Memo X-3136, Dec. 1974.
NASA Technical Memo X-71596.
"Spacecraft Radiators" in *Space/Aeronautics*, pp. 76-82, Jan. 1962.
Perveev, et al. "Antireflecting Coatings on Light-Absorbing Materials. . ." in Sov. J. Opt. Technology, vol. 41, Aug. 1974, pp. 453-455.

*Primary Examiner*—James R. Hoffman
*Attorney, Agent, or Firm*—N. T. Musial; G. E. Shook; John R. Manning

[57] ABSTRACT

The energy absorbing properties of solar heating panels are improved by depositing a black chrome coating of controlled thickness on a specially prepared surface of a metal substrate. The surface is prepared by depositing a dull nickel on the substrate, and the black chrome is plated on this low emittance surface to a thickness between 0.5 micron and 2.5 microns.

8 Claims, 2 Drawing Figures

SELECTIVE COATING FOR SOLAR PANELS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is concerned with improving solar heating panels. The invention is particularly directed to an improved coating for solar heating panels. The coating has high absorptivity for visible solar radiation and low emissivity for infrared radiation.

Solar collectors are devices that collect energy from the sun for conversion to heat and electrical power. These devices utilize flat composite panels to collect the energy.

Selective coating of the heating panels has been suggested to increase the energy absorbing properties. By way of example, a solar heating panel may be coated with black paint which is inexpensive and absorbs a great amount of solar energy. However, it has been found that paint flakes, chips, and is not very durable. Black paint also enables much of the absorbed energy to be lost by emittance.

Black nickel has also been used as a coating for solar heating panels. Black nickel is a good heat conductor, but coatings of this material are vulnerable to moisture.

Various attempts have been made to improve the black nickel coatings. For example, a substrate is first coated with bright nickel and then overlaid with a layer of black nickel. However, this bright-black nickel selective coating has been difficult to control in the deposition of black nickel coating in order to achieve the desired optimum properties and coating thickness. As the black nickel is being deposited, the substrate cannot be removed from the plating bath without the requirements for stripping the black nickel and restarting the deposition process again. Also, the black nickel, as deposited, is still subject to corrosion from the atmosphere and other sources.

Other thin exposed light-absorptive and heat transparent surface coatings are disclosed in U.S. Pat. No. 2,917,817 to Tabor. These coatings are in heat conductive relation to a bright metal base. Solar heating panels utilizing these coatings have been expensive and difficult to produce.

SUMMARY OF THE INVENTION

These problems have been solved by the present invention wherein black chrome is utilized as the selective solar coating. The black chrome deposit has a high absorptivity in the visible range and a low emissivity in the infrared range when the coating is between about 0.5 micron and about 2.5 microns.

OBJECTS OF THE INVENTION

It is, therefore, an object of the present invention to provide improved solar collectors having heating panels which absorb and retain a greater amount of solar energy by being coated with a material which is readily available and easily applied.

Another object of the invention is to provide improved solar heating panels having low cost coatings with high absorptivity and low emissivity while exhibiting long term durability under solar radiation.

A further object of the invention is to provide improved solar heating panels having a black chrome coating of controlled thickness.

Still another object of the invention is to provide improved solar heating panels which have coatings with improved stability and corrosion resistance.

These and other objects of the invention will be apparent from the specification which follows and from the drawings wherein like numerals are used throughout to identify like parts.

DESCRIPTION OF THE PREFERRED EMBODIMENT

Figure 1:
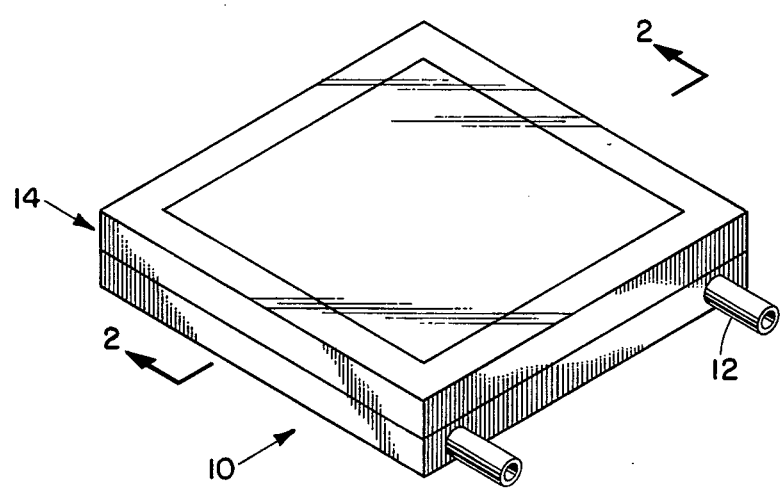
FIG. 1 is a perspective view of a solar collector embodying the features of the invention.

Referring now to the drawing, there is shown in FIG. 1 a solar collector 10 that is utilized to collect radiant energy from the sun for conversion to heat. A fluid, such as water or air, flowing through tubes 12 is heated by this energy. The solar collector 10 includes at least one substantially flat composite panel 14 constructed in accordance with the invention.

Figure 2:
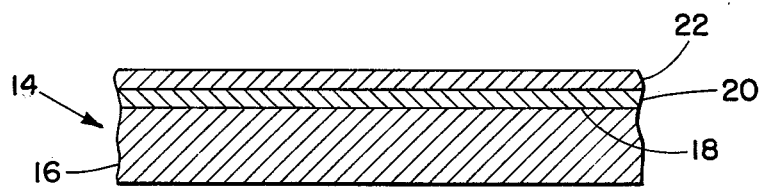
FIG. 2 is an enlarged vertical section view along the line 2—2 in FIG. 1.

As shown in FIG. 2 each composite panel 14 has a substrate 16 forming a high thermal conductivity base. The substrate 16 is a metal having good heat exchange properties, such as steel, aluminum, or copper. The substrate 16 has at least one surface 18 exposed to solar energy.

An important feature of the invention is that the surface 18 of the substrate 16 is coated with black chrome having the solar selective properties required for the solar collector 10. This black chrome coating has high absorptance across the solar spectrum and low emissivity in the 250° F blackbody thermal spectrum. The preparation of the surface 18 prior to coating is an important feature of the invention.

Black chrome was plated in accordance with the invention on aluminum tube sheet panels, after an appropriate zincating procedure. The black chrome was also plated on cold rolled steel panels that were buffed. The panels were 4 by 6 inches having a thickness of 0.035 inch. The application of black chrome was determined to be equally feasible on aluminum or steel.

Each panel was first electrolytically cleaned. An alkaline electrolytic cleaner interspersed with acid was used at 190° F at 70/80 amps/ft$^2$. Two cycles were used with an acid dip between them. An electrolytic alkaline material known commercially as a Kelating cleaner has been satisfactory.

A layer 20 of bright nickel was deposited onto the surface 18 of the substrate 16 to produce low emittance and to prevent the steel from rusting. The layer 20 was approximately 0.0005 inch thick and was plated in 15 minutes at 40 A/ft$^2$. A bright nickel plating solution known commercially as Zodiac prepared by the Harshaw Chemical Company has been satisfactory for the plating of the bright nickel.

A black chrome layer 22 was then deposited onto the bright nickel layer 20. The black chrome layer 22 was plated at 24 volts and 200 amps/ft$^2$ for three minutes. A black chrome electroplating solution made from a mixture known commercially as Chrome-Onyx manufactured by the Harshaw Chemical Company has been satisfactory.

Black chrome electroplating solutions can also be prepared in accordance with the teachings of a publication entitled METAL FINISHING, p. 268, by Metals & Plastic Publications, Inc, dated 1974. This publication lists a plating bath as follows:

| Chromic acid | 33–40 oz/gal |
|---|---|
| Acetic acid | 28.2 oz/gal |
| Barium acetate | 1 oz/gal |
| Temperature | 90-115° F |
| Current density | 40–90 amp/ft$^2$ |

Another plating both listed in this publication is:

| Chromic acid | 33 oz/gal |
|---|---|
| Fluorsilic acid | 0.033 oz/gal |
| Temperature | 80-95° F |
| Current density | 150–450 amp/ft$^2$ |

The black chrome coated panel was then water-rinsed, rinsed again in alcohol, and air dried.

Visible and infrared spectral reflectance measurements were measured for the black chrome coated panel B, several black nickel solar selective coating on panels E and F, and a black paint coating G. The spectral reflectance was measured with spectrophotometers with spherical diffuser reflector attachments. A MgO surface was used as standard for measurements in the range of 0.35 to 2.1 microns while an evaporated gold film was used as the standard from 3.0 to 18.0 microns.

The general appearance of the black chrome coating was indistinguisable from the black nickel coatings. The reflectances of the black chrome, the two black nickels, and the black paint integrated over the solar spectrum for air mass 2 were 0.132, 0.123, 0.133 and 0.033, respectively. The reflectances of these same coatings integrated over the blackbody spectrum for 250° F from 3 to 15 microns were 0.912, 0.934, 0.891, and 0.033, respectively.

These reflective measurements indicate absorptivity-to-emissivity ($\alpha/\epsilon$) values set forth in Table I. The values of absorptance and emissivity are also given in Table I. The black nickel coatings on panels E and F showed considerable differences in reflectance characteristics which were evidently the result of differences in application procedures The importance of the preparation of the surface 18 for coating is illustrated by panels A, C, and D as compared to the previously described coating B. Black chrome coating A was plated over dull nickel while coatings C and D were plated over surfaces roughened by grit blasting. In contrast, black chrome coating B was plated over bright nickel on steel buffed to a RMS roughness of less than 0.125 $\mu$m (0.5 $\mu$in.) as previously described.

The panels were the same size as panel B and were electrolytically cleaned in the same manner. Panel A had a layer 20 of dull nickel applied instead of a layer of bright nickel as panel B. The layer 20 of dull nickel was approximately 0.0005 inch (0.0125 m) thick and was plated in 15 minutes at 40 A/ft$^2$. A plating solution known commercially as NUSAT prepared by the Harshaw Chemical Company was satisfactory.

The general appearance of the black chrome on dull nickel coating on panel A was that of a matte diffuse surface as contrasted with the mirrorlike surface of the black chrome on bright nickel combination on panel B. Panels C and D appeared shiney but rough as contrasted with the dull flat appearance of panel A.

Spectral measurements were measured in the manner previously described. The roughening of the surface 18 either by underplating with dull nickel or by physical abrasion decreases the reflectance in the visible spectrum by approximately a factor of 2. The reflectance of the coating on panel A was indistinguishable from those of the coatings on panels C and D. However, the infrared reflectances of the coatings on panels C and D are lower than that of either panels A or B.

The increased absorptance of panels A, C and D is believed to be the result of a physical effect of light trapping. However, the roughness produced in the dull nickel is apparently of such a small scale that it has no effect on the infrared reflectance. The larger scale roughness produced by grit blasting produces a Hohlraum effect for the infrared reflectance.

Table II shows the variation of the solar selective properties of the black chrome on dull nickel coating on panel A with coating time.

TABLE II

SOLAR SPECTRUM ABSORPTANCE & 250° F BLACK BODY EMITTANCE OF SOLAR SELECTIVE BLACK Chrome ON DULL Nickel

| Plating Time | Absorptance | Emissivity |
|---|---|---|
| 15 Sec | 0.64 | 0.04 |
| 30 Sec | 0.87 | 0.06 |
| 1 Min | 0.96 | 0.10 |
| 2 Min | 0.96 | 0.12 |
| 4 Min | 0.95 | 0.17 |
| 10 Min | 0.94 | .34 |

TABLE I.

Visible Absorptance & Infrared Emissivity of Solar Selective Coatings

| | Coating Material | | Absorptance $\alpha$ | Emissivity $\epsilon$ | Absorptance to Emissivity |
|---|---|---|---|---|---|
| | Black Chrome on Nickel | | | | |
| A. | Dull Nickel | | 0.923 | 0.085 | 10.9 |
| B. | Bright Nickel Preparation | Surface Roughness 0.0125 $\mu$m (0.5 $\mu$in) Buffing | 0.868 | 0.088 | 9.8 |
| C. | Bright Nickel Preparation | 0.75 $\mu$m (30 $\mu$ in.) Grit Blasting | 0.930 | 0.12 | 7.8 |
| D. | Bright Nickel Preparation | 25- $\mu$m/100 -$\mu$in.) Grit Blasting | | | |
| | Black Nickel | | | | |
| E. | | | 0.877 | 0.066 | 13.3 |
| F. | | | 0.867 | 0.109 | 8.0 |
| | Black Paint | | | | |
| G. | Nextel | | 0.967 | 0.967 | 1.0 |

For plating time of 15 seconds to 10 minutes, the general appearance of the panel varied from almost purely dull-nickel appearance at 15 seconds to a velvet black at 10 minutes. Only a very faint deposit of black chrome could be observed on the 15 second panel by visual observation.

Spectral measurements were made. Both the visible and the infrared reflectances decrease with increasing plating time. There is an increase in black-chrome thickness with increasing plating time. There is first a rapid increase in visible absorptance without a significant increase in infrared emittance until a nearly maximum value of absorptance is reached, after which the emittance rapidly increases with no appreciable increase in absorptance. In fact, as plating is continued, there is even a slight decrease in absorptance across the solar spectrum.

The optimum plating time is determined by the radiative energy balance of the collector plate. It has been found that the optimum plating time is approximately one minute at 180 A/ft². This produces a coating having a thickness between about 0.5 micron and about 2.5 microns.

While the preferred embodiment of the invention has been described, it will be appreciated that various modifications may be made without departing from the spirit of the invention or the scope of the subject claims.

What is claimed is:

1. In apparatus for collecting solar energy of the type having a composite heating panel for absorbing said solar energy and converting the same to heat, the improvement comprising a metallic substrate forming a high conductivity base for said panel, said substrate having at least one surface exposed to said solar energy, a layer of dull nickel on said one surface to lower the emissivity of said surface, and a coating of black chrome on said layer of dull nickel, said coating having a thickness between about 0.5 micron and about 2.5 microns and being highly absorbtive in the visible range.

2. Apparatus as claimed in claim 1 wherein the substrate is steel.

3. Apparatus as claimed in claim 1 wherein the substrate is aluminum.

4. Apparatus as claimed in claim 1 wherein the layer of dull nickel has a thickness of about 0.0005 inch.

5. A method of making a composite heating panel for a solar collector comprising the steps of depositing a layer of dull nickel to a thickness of about 0.0005 inch on a surface of a high thermal conductivity substrate to lower the emissivity thereof, and coating said layer of dull nickel with black chrome to a thickness between about 0.5 micron and about 2.5 microns to raise the absorbtivity of said surface in the visible range.

6. A method of making a composite heating panel as claimed in claim 5 wherein the surface of the substrate is roughened.

7. A method of making a composite heating panel as claimed in claim 6 wherein the substrate surface is roughened by physical abrasion.

8. A method of making a composite heating panel as claimed in claim 7 wherein the substrate surface is grit blasted to a roughness of between about 0.75 μm and about 25μm.

* * * * *